Figure 1:
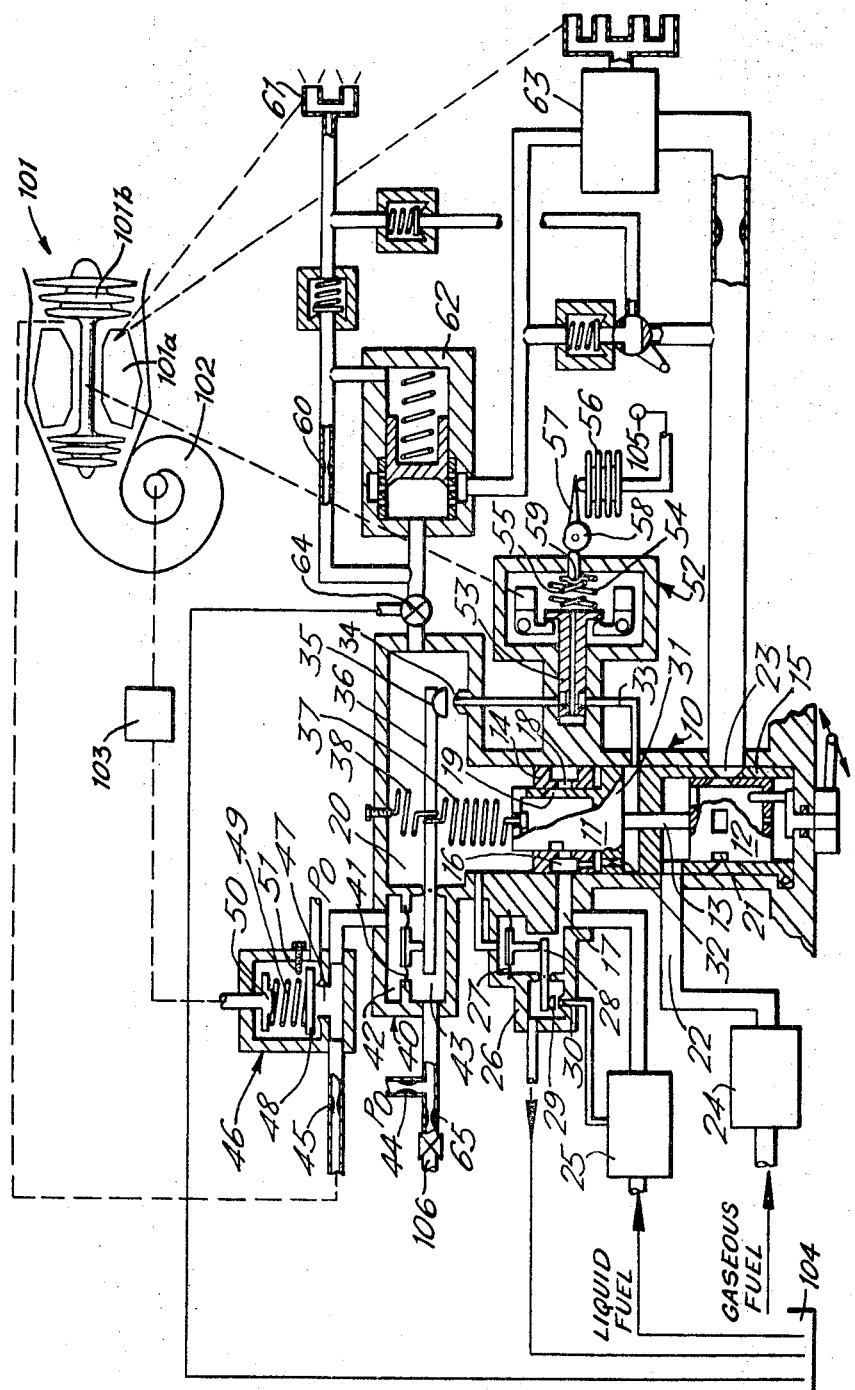

United States Patent

[11] 3,577,877

[72] Inventor Eugene Harold Warne
     Solihull, England
[21] Appl. No. 803,650
[22] Filed Mar. 3, 1969
[45] Patented May 11, 1971
[73] Assignee Joseph Lucas (Industries) Limited
     Birmingham, England

[54] FUEL CONTROL SYSTEMS FOR DUAL FUEL GAS TURBINE ENGINES
15 Claims, 3 Drawing Figs.

[52] U.S. Cl. .................................................. 60/39.28,
     60/39.14, 123/121, 137/637.4, 137/636.4
[51] Int. Cl. ............................................... F02c 9/08,
     F02d 33/00, F02c 3/20
[50] Field of Search .................................... 60/39.28,
     39.14; 123/27 (GE), 120, 121; 137/637.4, 636.4

[56] References Cited
     UNITED STATES PATENTS

| | | | |
|---|---|---|---|
| 685,510 | 10/1901 | Flint | 137/637.4X |
| 2,579,215 | 12/1951 | Tenuyl | 60/39.28(UX) |
| 2,668,415 | 2/1954 | Lawrence | 60/39.28 |
| 2,690,167 | 9/1954 | Moulton | 60/39.28(UX) |
| 2,739,577 | 3/1956 | Moulton | 123/27(GAS)(UX) |
| 2,757,511 | 8/1956 | Jagger | 60/39.28 |
| 2,933,894 | 4/1960 | Johnson et al. | 60/39.28 |
| 3,019,603 | 2/1962 | Kreutzer | 60/39.14X |
| 3,052,095 | 9/1962 | Prachar | 60/39.28 |
| 3,230,709 | 1/1966 | Turner | 60/39.28 |
| 3,252,283 | 5/1966 | Jackson et al. | 60/39.28 |
| 3,318,090 | 5/1967 | Jubb et al. | 60/39.28 |
| 3,427,804 | 2/1969 | Lawrence | 60/39.28 |

Primary Examiner—Al Lawrence Smith
Attorney—Holman, Glascock, Downing & Seebold

ABSTRACT: The invention relates to a system for regulating the flow of two fuels to an engine adapted to run on either, regulation being achieved by two coupled valve members, each of which controls the flow of one fuel and which are moved axially by a servosystem powered by one of the fuels. The coupled valve members are rotatable about a common axis to vary the proportion of either fuel supplied to the engine. The configuration of the valve members is such that the total amount of fuel supplied to the engine remains substantially constant, in terms of the requirements of the engine. The servomechanism includes one or more control elements which are operated by signals obtained from the engine itself and/or from apparatus driven by the engine.

Patented May 11, 1971

3,577,877

2 Sheets-Sheet 1

INVENTOR
E. H. WARNE
BY Holman, Glascock,
Downing & Seebold
ATTORNEYS

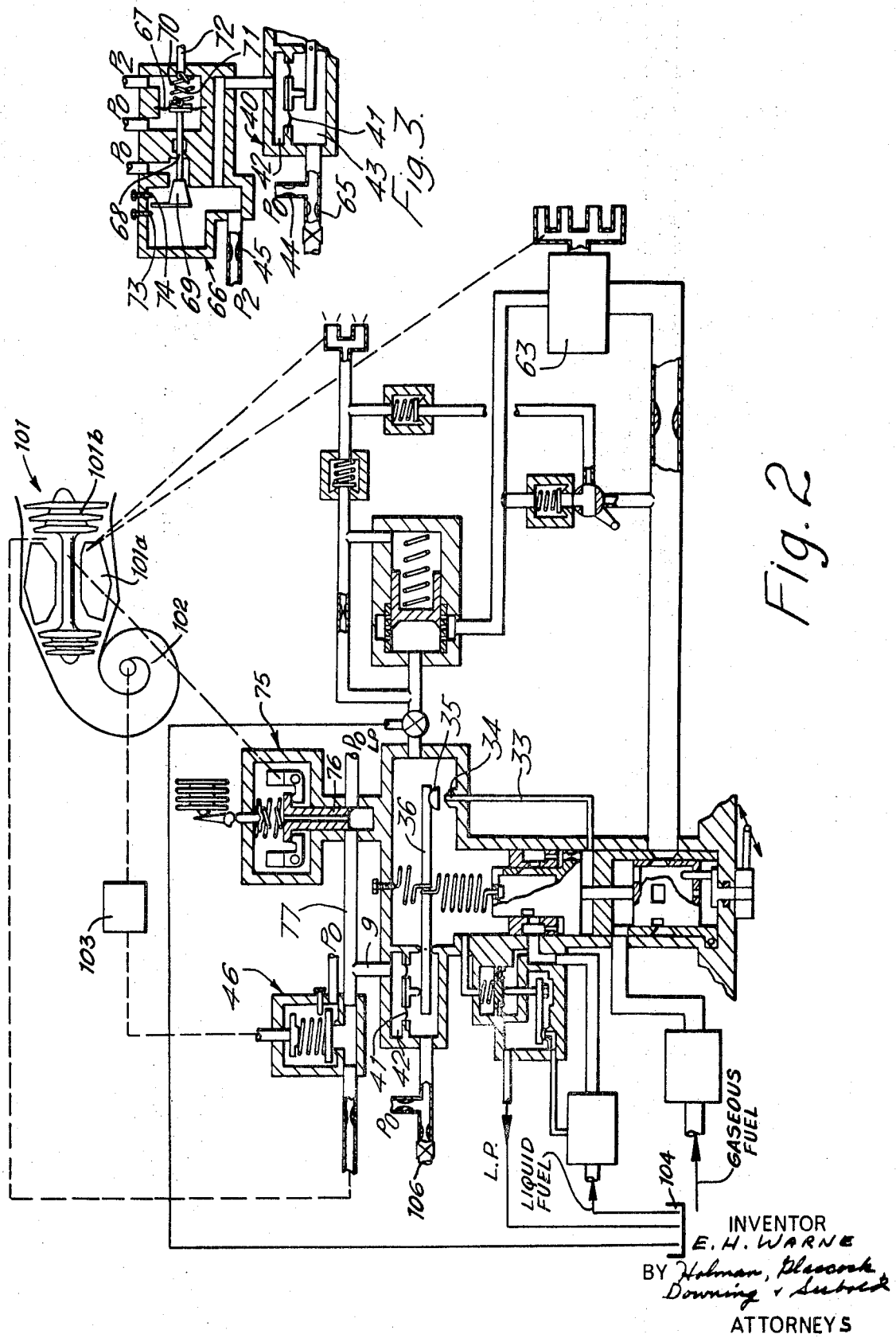

FUEL CONTROL SYSTEMS FOR DUAL FUEL GAS TURBINE ENGINES

This invention relates to a fuel control system for a dual fuel gas turbine engine. It is an object of the invention to provide a dual fuel control system in which change from one fuel to another while the engine is running can be simply effected.

A dual fuel control system in accordance with the invention comprises a servo-operated valve device incorporating a pair of valve parts for controlling flow of the two fuels respectively, the two valve parts being coupled together for movement both angularly about a common axis and axially, the arrangement being such that at opposite limits of the angular movement of said valve parts the flow of the respective fuels is completely prevented, and for any given axial position in which the valve parts are located by the action of the associated servomechanism, the amount of one fuel which can flow to the associated engine under the control of one of said valve parts when in one limiting angular position is equivalent in terms of requirements of the said engine to the amount of the other fuel which can flow to the engine under the control of the other of the valve parts in the other limiting angular position.

Reference is now made to the accompanying drawings in which:

FIG. 1 is a diagram showing an example of a fuel control system in accordance with the invention, FIG. 2 is a diagram of an alternative arrangement of a fuel control system, FIG. 3 is a diagram of a modification to the systems shown in FIGS. 1 and 2.

In the examples shown the fuel system is intended for controlling the flow of a liquid fuel or a gaseous fuel to the dual fuel main burners 101a of a static gas turbine engine 101 which is used to drive a separate turbine 102 driving a load. The system shown includes a valve device 10 which includes a liquid fuel control valve part 11 and a gaseous fuel control valve part 12 fixed together by means of a stem 13. Each such valve part has a cylindrical surface sliding within a bore in an associated sleeve 14, or 15. In the case of the valve part 11, the sleeve 14 has an external peripheral groove 16 communicating with a liquid fuel inlet passage 17 in the housing of the valve device 10. The sleeve 14 has a plurality of separate angularly spaced ports 18 from the groove 16 into the central bore of the sleeve 14. The valve part 11 is of hollow form and is formed with a plurality of ports 19 angularly spaced correspondingly to the ports 18. The member 11 opens at one end into a chamber 20 within the valve housing from which liquid fuel can flow to the burners of the engine as will be hereinafter explained. The valve part 12 is similarly of hollow form formed in its wall with angularly spaced ports 21 and formed at one end with an opening through which gaseous fuel can enter the interior of the valve part 12 from the gas inlet passage 22. The sleeve 15 likewise has separate angularly spaced ports 23 which coact with the ports 21 to permit flow of gaseous fuel from the inlet passage 22 to the burners.

The two valve members 11, 12 and the associated sleeves 14, 15 are angularly orientated relative to one another such that when the ports 19 are angularly aligned with the ports 18, the ports 21 are completely out of alignment with the ports 23 so that, irrespective of the axial position of the valve parts 11, 12 there can be no flow of gaseous fuel to the burners. Conversely, when the valve parts are positioned angularly so that the ports 21 are fully aligned with the ports 23 there can be no flow of liquid fuel to the burners irrespective of the axial position of the valve parts 11, 12.

The supply of gaseous fuel to the inlet 22 is controlled by a constant pressure valve 24. The supply of liquid fuel is obtained from a variable stroke pump 25 provided with an inbuilt stroke varying servo from which liquid is spilled by means of a pressure drop control valve 26. This valve is of known form and includes a diaphragm 27 which senses on one side the pressure in the chamber 20 and on the other side the pressure at the inlet 17 and which operates a lever 28 carrying a valve control element 29 coacting with a nozzle 30 so as to control the flow of liquid from said nozzle 30 to maintain the pressure drop from the inlet 17 to the chamber 20 at a constant value. The relative axial positions of the sleeves 14, 15 and the relative sizes of the ports 18, 19, 21 and 23 are so chosen that, for any axial position of the valve parts 11, 12 the flow of liquid fuel when the valve parts 11, 12 are positioned to shut off gas flow is exactly equivalent in terms of the running speed of the associated gas turbine engine, as the gas flow which would take place if the valve parts 11, 12 were angularly positioned to shut off the liquid fuel flow.

The servomechanism for axially positioning the valve parts 11, 12 comprises a piston 31 which is shown in the drawing as being integral with the valve part 11. One side of this piston is acted upon by liquid fuel at the pressure of the inlet 17. A restricted passage 32 allows the flow of fuel to the opposite side of the piston 31 and through a passage 33 to a nozzle 34 directed into the chamber 20. The restricted passage 32 is shown being formed in the piston 31 itself. It is to be appreciated, however, that this passage could equally well be provided in the wall of the housing itself. The flow of liquid fuel from the nozzle 34 is controlled by a servovalve control member 35 on a lever 36 in the chamber 20. This lever is acted upon by a spring 37 coupled to the lever and to the valve part 11. The spring 37 serves to urge the valve parts 11, 12 axially to reduce fuel flow therethrough and to urge the lever 36 to cause the control member 35 to approach the nozzle 34. A further spring 38 acts on the lever 36 urging it in the opposite direction and is adjustable for the purpose of setting a datum position for the lever 36.

For urging the lever 36 in the opposite direction there is provided a device 40 sensitive to pressure obtaining in the region of the compressor 101b on the engine under control. This device 40 includes a diaphragm 41 dividing a chamber 42 from a chamber 43. The chamber 43 is connected via a restrictor 44 to atmosphere. The chamber 42 is connected by passage 9 via a restrictor 45 to a tapping at the delivery side of the compressor. As shown, the device 40 is arranged so that whenever the compressor delivery pressure is in excess of the prevailing atmospheric pressure a force will be applied to the lever 36 opposing the forces applied thereto by the springs 37, 38.

In order that the power demand of the aforementioned separate turbine is taken into account in the control of the engine there is provided a limit valve 46 which includes a valve seat 47 against which a valve closure 48 is urged by a spring 49. The spring 49 is engaged against a movable abutment 50 associated with a governor 103 of any convenient form driven by the separate turbine. This governor is arranged to displace the abutment 50 to increase the pressure applied by the spring 49 to the valve closure 48 as the turbine power demand increases. The valve closure 48 controls flow of air from the downstream side of the restrictor 45 to atmosphere. The closure 48 is acted upon by air at the same pressure as air in the chamber 42, such pressure acting to lift the closure 48 from its seat. Thus, in use, the pressure actually applied to the chamber 42 is limited to the pressure required, at the prevailing power demand of the separate turbine, to lift the valve member 48 from its seat. A stop 51 is included in the limit valve 46 to limit opening movement of the valve closure 48.

For setting the top speed of the engine controlled by the system shown, there is provided a governor 52 of any convenient form driven by the engine. This governor operates a valve 53 in the line 33 so as to restrict flow therein when the governor comes into operation. The valve 53 is acted upon by a spring 54 and a further spring 55 which applies a variable load to the valve 53 according to the prevailing atmospheric temperature. Such temperature is sensed by a bulb 105 to create a pressure signal within a bellows 56 operating an arm 57 connected to a cam 58. The cam 58 is arranged to displace an abutment 59 against which the spring 55 is engaged so that, as the atmospheric temperature rises, the spring load on the valve 53 is reduced. This prevents the rise of the governed speed which can occur in known systems without ambient temperature compensation.

When it is required to run the engine on liquid fuel, the valve parts 11, 12 are set angularly so that gas flow is prevented. Liquid fuel from the chamber 20, flows, via a restrictor 60 to a pilot burner 61, and via a pressure-sensitive flow control valve 62 sensitive to the pressure across the restrictor 60 to the main burner 63. During normal steady running the pressure applied to the chamber 42 is dependent upon the compressor delivery pressure and on the prevailing power demand of the separate turbine. An equilibrium condition exists within the servomechanism in which the pressure drop across the piston 31 exactly balances the spring force applied to the valve part 11 and in which the spring forces applied to the lever 36 are exactly balanced by the pressure in the chamber 42. During acceleration the abutment 50 will be displaced by the separate turbine governor to increase the spring pressure on the valve closure 48 so that the pressure sensed by the diaphragm 41 rises to lift the servovalve control member 35 away from the nozzle 34, thereby allowing increased flow through the restricted passage 32 so that the valve part 11 is displaced to permit any increasing fuel flow. During deceleration the valve closure member 48 opens against the stop 51 thereby establishing an air potentiometer constituted by the restrictor 45 and the valve 46 so that a pressure derived from the compressor delivery pressure is applied to the chamber 42. The top speed governor operates by restricting fuel flow through the passage 33 thereby decreasing the pressure drop across the piston 31 and causing the valve part 11 to move to restrict fuel flow.

When the engine is operated wholly on gaseous fuel the valve parts 11, 12 are turned to the angular position in which the liquid fuel flow past the valve part 11 is totally prevented. A further valve 64 at the outlet of the chamber 20 is operated to shut off the supply of liquid fuel to the restrictor 60 and the valve 62 and, in effect, to connect the chamber 20 to the low-pressure reservoir 104 from which liquid fuel is drawn by the pump 25. The servomechanism described still maintains full control of the fuel flow to the burners, the output of the pump 25 being restricted to maintain the same pressure drop from the liquid fuel inlet 17 to the chamber 20. This ensures that the operation of the servosystem is completely unaffected by the changeover.

The engine can also be run with the valve 64 open to permit the supply of liquid fuel to the burners and with the valve parts 11, 12 in positions intermediate the limiting positions described above. Consequently, it is a relatively simple mater to switch from one fuel to another whilst the engine is running, irrespective of whether the engine is running steadily, accelerating, or decelerating at the time of the changeover.

If it is required to light the burners on gaseous fuel a pressure controlled gas supply 106 is connected via a restrictor 65 to the chamber 43. The restrictors 65 and 44 form, in combination a potentiometer so that pressure is applied to the chamber 43 to reduce the effect of the delivery pressure of the engine during cranking so that a reduced supply of gas is supplied to the burners to facilitate lighting.

In the example shown in FIG. 2 a top speed governor 75 substantially as previously described with reference to FIG. 1 has its valve member 76 arranged to control flow to atmosphere through a passage 77 connected to the passage 9. The governor 75 thereby acts in conjunction with the relief valve 46 to control, in use, the pressure in the chamber 42. As previously described, during acceleration or deceleration the relief valve 46 tends to increase or decrease respectively the flow of fuel to the burner 63. With increasing speed the valve member 76 permits an increased flow through the passage 77 and thereby reduces the pressure sensed by the diaphragm 41, tending to move the lever 36 so as to urge the control member 35 towards the nozzle 34 and thereby to reduce the flow through the passage 33. Reduced fuel flow through the passage 33 allows the valve parts 11, 12 to move in a direction to reduce fuel flow, as previously described.

In the modification shown in FIG. 3, a servo-operated valve 66 is substituted for the limit valve 46 of FIG. 1. In this case there is a diaphragm 67 which is connected via a stem 68 to a tapered valve control member 69 which controls flow from the downstream side of the restrictor 45 to atmosphere. The diaphragm is acted upon at one side by the full compressor delivery pressure and at the other side by atmospheric pressure. In addition there is a spring 70 which acts on the diaphragm to urge the valve control member 69 to a position in an opening direction and a spring 71 which urges the diaphragm in the opposite direction. This spring 71 is adjustable by the separate turbine governor output member 72. In equilibrium the member 69 takes up a position determined by the turbine power demand and the delivery output pressure and the pressure applied to chamber 43 of the device 40 is thereby continuously variable both in terms of turbine power demand and the compressor delivery pressure. Stops 73, 74 are provided for limiting opening and closing movement of the member 69 to determine the deceleration and acceleration characteristics of the control system.

A valve like the valve 66 could also be employed to control a variable restrictor in the passage 33 to give approximately the same effect.

I claim:

1. A fuel control system for a dual fuel gas turbine engine comprising a servomechanism, a valve device incorporating a pair of valve parts for controlling the flow of the two fuels respectively, the two valve parts being coupled together for movement both angularly about a common axis and axially by the servomechanism, the arrangement being such that at opposite limits of the angular movement of said valve parts the flow of the respective fuels is completely prevented, and for any given axial position in which the valve parts are located by the action of the associated servomechanism, the amount of one fuel which can flow to the associated engine under the control of one of said valve parts when in one limiting angular position is equivalent in terms of requirements of the said engine to the amount of the other fuel which can flow to the engine under the control of the other of the valve parts in the other limiting angular position.

2. A system as claimed in claim 1 in which the servomechanism is operated by one of the fuels.

3. A system as claimed in claim 1 in which the servomechanism positions the valve parts in accordance with signals obtained, in use, from the engine which the system controls and/or from other apparatus driven thereby.

4. A system as claimed in claim 2 in which the servomechanism includes a piston coupled to the said valve parts and urged by a pressure difference across the piston created by the passage of at least a part of the flow of one fuel through a restriction and one or more flow regulating means for varying the rate of flow of the said part of the one fuel.

5. A system as claimed in claim 4 which includes valve means tending to maintain the said passage of the said one fuel through the said restriction even when flow of the said one fuel through its associated valve part is completely prevented.

6. A system as claimed in claim 4 which includes pressure regulating means for the said one fuel whereby the total pressure drop through the restriction and said flow regulating means remains substantially constant.

7. A system as claimed in claim 1 in which the servomechanism includes a lever coacting both with the valve parts and with a pressure-sensitive element subjected to an air pressure signal.

8. A system as claimed in claim 7 which includes at least one pressure regulating means whereby a known proportion of the air pressure signal is supplied to the pressure-sensitive element.

9. A system as claimed in claim 8 in which the pressure regulating means includes a closure member positioned with respect to an orifice in accordance both with the magnitude of said air pressure signal and with a signal proportional to the power demand of the engine which the system controls or of other apparatus driven thereby.

10. A system as claimed in claim 7, in which the lever operates as one of the flow regulating means for varying the rate of flow of said one fuel through the said restriction.

11. A system as claimed in claim 4 in which one of the flow regulating means comprises a valve member responsive to the speed of the engine being controlled or of other apparatus driven thereby.

12. A system as claimed in claim 4 in which one of the flow regulating means comprises a valve member responsive to temperature.

13. A system as claimed in claim 6 in which one of the pressure regulating means comprises a valve member responsive to the speed of the engine being controlled or of other apparatus driven thereby.

14. A system as claimed in claim 6 in which one of the pressure regulating means comprises a valve member responsive to temperature.

15. A system as claimed in claim 7 which includes means for supplying gas at a constant pressure to the pressure-sensitive element, the said gas acting in opposition to the air pressure signal.